United States Patent [19] [11] 4,337,238
Cody et al. [45] Jun. 29, 1982

[54] METHOD OF GROWTH OF PRIMARY ANHYDRITE CRYSTALS UNDER MODERATE CONDITIONS

[75] Inventors: Robert D. F. Cody, Ames, Iowa; Amy B. Hull, Downers Grove, Ill.

[73] Assignee: Iowa State University Research Foundation, Inc., Ames, Iowa

[21] Appl. No.: 264,595

[22] Filed: May 18, 1981

[51] Int. Cl.³ ............................................. C01F 11/46
[52] U.S. Cl. .................................... 423/555; 423/266
[58] Field of Search ............... 423/266, 555; 106/109, 106/110, 111, 114

[56] References Cited

U.S. PATENT DOCUMENTS 2,222,385 11/1940 Washburn et al. .................. 423/555
3,121,702 2/1964 Sherr et al. ........................ 106/111
4,102,697 7/1978 Fukuba et al. ..................... 106/111
4,120,737 10/1978 Berrie et al. ....................... 106/109
4,157,264 1/1979 Kennedy-Skipton ............... 106/111
4,183,908 1/1980 Rolfe .................................. 423/555

FOREIGN PATENT DOCUMENTS 2325738 12/1974 Fed. Rep. of Germany ...... 106/111
50-44194 4/1975 Japan ................................. 423/555

OTHER PUBLICATIONS

Hardie, Lawrence A., The Gypsum-Anhydrite Equilibrium at one Atmosphere Pressure, American Mineralogist vol. 52 Jan. Feb 1967 pp. 171-200.

Primary Examiner—Gary P. Straub
Attorney, Agent, or Firm—Zarley, McKee, Thomte, Voorhees & Sease

[57] ABSTRACT

A method of selective formation of anhydrite crystals, to the predominant exclusion of formation of gypsum and bassanite, by addition of a small but effective amount of a selective crystallization inhibitor, which inhibits the formation of gypsum and bassanite crystals, but not anhydrite crystals.

12 Claims, No Drawings

METHOD OF GROWTH OF PRIMARY ANHYDRITE CRYSTALS UNDER MODERATE CONDITIONS

BACKGROUND OF THE INVENTION

Calcium sulfate exists in the earth's sediment in three mineral forms. The most common is gypsum which is the fully hydrated form: $CaSO_4.2H_2O$. The partially hydrated form of the mineral is known as bassanite and has the following formula $(CaSO_4)_2.H_2O$.

Calcium sulfate crystals with no water hydration are known as "anhydrite". When found in sedimentary rocks, it is a compact, granular mass which resembles marble in appearance. It differs from gypsum and bassanite in hardness and lack of hydration.

For many years the origin of anhydrite in ancient sedimentary rocks has been controversial. Probably the majority of sedimentologists today have concluded that most ancient anhydrites results from dehydration of primary gypsum. This conclusion is based on the apparent impossibility of producing synthetic primary anhydrite under laboratory conditions similar to those prevailing within evaporite environments, and on the rarity of anhydrite in modern evaporite sediments. It has been known that anhydrite can be made from gypsum by heating natural gypsum to elevated temperatures as high as 800° C. to 1000° C. to drive off the water, leaving a secondary formation of anhydrite. However, such processes are time consuming, energy consuming and therefore not economical.

There is presently no economically practical source of synthetic precipitated anhydrite. The phrase "synthetic precipitated anhydrite" is used to designate anhydrite which is available from a controlled chemical manufacturing process. This is to be distinguished from anhydrite available from natural sedimentation processes, or that formed by either natural or commercial dehydration of gypsum.

It is a primary object of this invention to provide a commercially feasible process for preparation of precipitated synthetic anhydrite, on a bulk basis.

It is a further object of this invention to provide a process for the commercially feasible preparation of anhydrite which utilizes moderate conditions of temperature and pressure resembling those found in hot, arid regions.

It is a further object of this invention to provide a process for the preparation of anhydrite so that large quantities of anhydrite might be available for a multitude of probable uses such as fillers, pigments, whitening agents, and use as extenders, and the like.

In nature, as in laboratory experiments, anhydrite can potentially form by a variety of mechanisms. Undoubtedly, much anhydrite in ancient rocks resulted from dehydration of gypsum or bassanite. Although these minerals are easily dehydrated at high temperatures under laboratory conditions, there is some uncertainty about simple dehydration in aqueous solutions. For example, some workers have observed that gypsum dehydrates to bassanite via a solution-precipitation mechanism. The major geochemical unknown, however, is whether anhydrite can actually precipitate from solutions in a sedimentary environment. This precipitation could involve two different types of crystal nucleation; primary or secondary. In primary nucleation, spontaneous crystallization occurs in the absence of crystalline seed material. In secondary nucleation, crystallization is induced by crystalline seeds that may be, but are not necessarily, the same as the nucleating substance. An example of secondary nucleation is the crystallization of anhydrite in the presence of anhydrite seeds, or in the presence of gypsum seeds that slowly dissolve as anhydrite simultaneously grows.

Despite much experimentation over many years, researchers have never succeeded in producing primary nucleation of anhydrite under comparatively low temperature conditions, that is, conditions even remotely similar to those occuring in natural sedimentary environments. In the experiments, gypsum or bassanite invariably precipitate metastably at temperatures and water salinites in which anhydrite is the expected stable phase. Previous experiments have induced the secondary nucleation and growth of anhydrite in the presence of gypsum or bassanite precursors only under conditions of extremely high temperatures, salinites, and/or reactant ion concentrations. These conditions rarely, if ever, are duplicated within natural sedimentary environments, and for the most part are not commercially practicable.

The primary objective of the present invention, as heretofore stated, is to form anhydrite, at temperatures and inorganic ion concentrations, common in waters located in hot, arid, regions of the earth, and at conditions which will readily allow commercial manufacture.

SUMMARY OF THE INVENTION

Anhydrite crystals can be formed under moderate temperatures and inorganic ion concentrations if certain types of selective crystallization inhibitors are present. The inhibitors selectively inhibit the formation of gypsum and possibly bassanite, but do not interfere with the formation of anhydrite crystals.

Inhibitors employed are small but effective amounts of polyacrylic acid, polymaleic acid, and organophosphate esters. Importantly, only small amounts of such selective inhibitors need be employed.

DETAILED DESCRIPTION OF THE INVENTION

Of course, the starting materials for preparation of anhydrite crystals must be of necessity be aqueous solutions of a calcium salt, and aqueous solutions of a sulfate salt. In accordance with the process, one prepares an aqueous solution of a calcium salt, such as calcium chloride, and separately prepares an aqueous solution of a sulfate salt, such as ammonium sulfate.

The concentrations of these aqueous salt solutions are not critical, the important factor only being that they serve as a source for the respective calcium ions, and sulfate ions. The only requirement is that the salts be water soluble salts. The most conveniently available sources for both would be calcium chloride for the calcium salt, and ammonium sulfate for the sulfate salt. However, it should be understood that other water soluble inorganic salts may satisfactorily function as a source of both the calcium ion and the sulfate ion. For example, with respect to calcium, water soluble inorganic slats, one may employ calcium nitrate, calcium acetate, and the like. With regard to the source of the sulfate ion, one may also employ sodium sulfate, ammonium sulfate, lithium sulfate, etc., with equally satisfactory results. Again, the only important criteria is that the sulfate salt is highly water soluble, and that the salt source itself not interfere with the formation of anhydrite crystals.

Because of overall ease of availability, it is preferred that the aqueous inorganic salt solution source of calcium ion be calcium chloride, and that the aqueous inorganic salt solution source of sulfate ion, be ammonium or sodium sulfate.

The concentrations of calcium salt solution and the sulfate salt solution are not critical. Satisfactory results can be obtained with solutions varying from within the range of 0.5 normal to 3 normal concentration up to as high as the saturation limit at the temperature provided. However, at larger Ca and $SO_4$ concentrations, greater amounts of inhibitor and slower rates of reactant mixing may be required. Again, the important criteria to keep in mind, are that the concentrations, and temperature, should be within the range of predicted stability for anhydrite formation. Those conditions are published and known. That is to say, the concentration and temperature should fall within the range where one would normally predict, in theory, anhydrite crystals would form; but for reasons that are not fully understood, they ordinarily do not because gypsum preferentially forms. For details with regard to theoretical concentration and temperature for formation of anhydrite, see Hardie, L. A., 1967, The Gypsum-Anhydrite Equilibrium at One Atmosphere Pressure: *American Minerologist*, V. 52, P. 171-200, which is incorporated herein by reference.

As depicted in the referenced article, generally, at least in theory, it can be seen that the more concentrated the aqueous solutions, that is the greater the ionic strength, and the higher the temperature, the more the conditions favor formation of anhydrite. In the process of the present invention, temperatures of from 60° C. to 80° C. have been found satisfactory.

Also, because the higher the ionic strength, the greater the propensity for the formation of anhydrite, it has been found preferable to add to the aqueous solution from about 5% to about 20% by weight of the combined aqueous solutions weight of a water soluble, inorganic salt which does not form an insoluble substance with either the aqueous calcium salt solution, or the aqueous sulfate salt solution. The most common and therefore preferred inorganic salt meeting these criteria is sodium chloride. The effect of this salt addition is to increase the overall ionic strength and thus to shift the reaction equilibrium more towards conditions predominantly in favor of formation of anhydrite crystals. The preferred quantity of the inert inorganic salt is from 5% to about 10% by weight of the combined aqueous solutions. Of course, other salts might also be used, such as lithium chloride, or the like, as long as they do not hinder anhydrite precipitation.

A mere combining of the aqueous calcium salt source solution and the aqueous sulfate salt source solution, at the conditions specified herein, will result in the formation of gypsum. However, after experimenting with a multitude of crystallization inhibiting agents, it has been discovered that a certain few crystallization inhibiting agents, at least under the conditions specified herein, will selectively inhibit the formation of gypsum and probably bassanite crystals, but not interfere with the formation of anhydrite.

While there are a large variety of different inhibitors available and known for one use or another, heretofore there have been no known crystallization inhibiting agents which selectively inhibit the nucleation and/or growth of gypsum but yet allow the formation of anhydrite crystals.

Under the conditions specified in this invention, polyacrylic acid, polymaleic acid and certain types of phosphate esters, i.e., nitribo tri alkyl acid phosphates, alter the kinetics of the crystallization so that anhydrite is the only significant crystallization product. In particular, inhibitor chemicals such as Goodrich KXP-8 and Aquaness Chemical Co. Calnox 214 and Calnox 214H (polyacrylic acids M.W. 800-1200); Ciba-Geigy Belclene 200 (polymaleic acid) and Belclene 500 (phosphino-polycarboxylic acid); and Phillip A. Hunt Chemical Co. Wayhib S, a phosphate ester (nitrilo tri ethyl acid phosphate) have this property.

Although now wishing to be bound by a theory, it seems that these compounds, inhibit gypsum and probably bassanite crystallization, rather than accelerate anhydrite nucleation. It is believed that they operate in the following manner: The compounds are strongly absorbed on gypsum and perhaps bassanite nuclei which present their growth. As a result, anhydrite crystallizes in their place, when the supersaturation level for anhydrite is achieved.

In accordance with the process of the present invention, the amount of selective crystallization inhibitor, that is polymaleic acid, polyacrylic acid, or organophosphate ester, employed is a small but effective amount. This can range from about one part per million (ppm) to about 10,000 parts per million, with from about 500 parts per million to about 2,000 parts per million being preferred. The minimum amount required will depend on the concentrations of Ca and $SO_4$ in the reactant solutions and on the specific inhibitor.

The most preferred selective crystallization inhibitor is lower molecular weight polyacrylic acid having a molecular weight within the range of about 800 to about 1200. It is preferred because it has been found that polymaleic acid and certain types of organophosphate esters work satisfactorily under slower sedimentation conditions, but under more rapid mixing conditions with pure solution phase, which is the most practical for commercial operation, most successful results seem to be achieved with polyacrylic acid.

In mixing of the aqueous calcium salt solution and the aqueous sulfate salt solution in the presence of the selective crystallization inhibitor, care must be exercised. The crystallization inhibitor is mixed with at least one of the solutions, and may be mixed with both if desired. It must, however, be added to at least one of the original solutions before they are mixed. If they are mixed first and then the selective crystallization inhibitor is added, it is too late. Gypsum will form. On the other hand, if the selective crystallization inhibitor is present at the time of mixing of the original ion source solutions, then the inhibitor works, and only anhydrite forms. Preferably the mixing of the aqueous solutions in the presence of the cystallization inhibitor is slow and at a rate of from about 0.01 milliliters per minute (ml/min.) to about 0.2 milliliters per minute, with from 0.05 milliliters per minute to a rate of 0.15 milliliters per minute being preferred. If the rate of addition is much faster than the rate specified herein, it has been found that gypsum and bassanite nuclei form so fast that inhibitor cannot be adsorbed on the major portion of the crystal nuclei. A slower rate of addition within the ranges specified prevents the mixed solution from being flooded with gypsum and bassanite nuclei. And, the selective crystallization inhibitors of this invention will work to enhance formation of anhydrite crystals, by inhibiting formation of gypsum and bassanite. The preferred rates of addition specified have been found most satisfactory to optimize anhydrite formation since they are sufficiently slow to allow pre-critical nuclei of gypsum to be inhibited by the additive.

It has also been found that pH is an important factor, and that the selective inhibition of crystallization within the controlled range of conditions specified herein is best at a pH within the range of from about 4.5 to about 7.5, and most preferably at a pH of from about 5 to about 6. At a pH within the preferred range, controlled by, for example, addition of sodium hydroxide to attain the desired level, predominant amounts of fine, plate-like, high quality pure crystals of synthetic anhydrite, are achieved. If the pH is below about 3.5, anhydrite is not formed, but gypsum is formed. At pH's above 6, the yield may be significantly reduced and at very high base conditions, gypsum may again crystallize, depending on the specific inhibitor.

The selective crystallization inhibitors are readily available from numerous chemical supply houses, for example, Monsanto Corporation, Aquaness Chemicals, Hunt Chemical Corporation, Calgon Company and others.

The results of the process of the present invention, as illustrated in the examples which follow are fine, pure, well-formed and tiny cyrstals of anhydrite, which are indistinguishable from sedimentary anhydrite.

EXAMPLES

Using solutions of 1 N calcium chloride dihydrate and 1 N ammonium or sodium sulfate, each containing 5% sodium chloride, about 5 parts/thousand of KXP-8 are added to the sulfate solution. After mixing the KXP-8, the sulfate solution pH is adjusted to about pH 6 with sodium hydroxide using a pH meter calibrated with a standard pH 7 buffer. About 50 ml of the additive-containing sulfate solution is heated in a constant temperature bath to about 60° C. About 40 ml–50 ml of the calcium solution is then slowly added at a rate of about 0.07 ml/min to the warm sulfate solution. The anhydrite obtained is then removed from the mother liquor by filtration, washed in distilled water, and dried at any convenient temperature.

It has been found for these operating conditions, a pH 3 or pH 11.5 rather than pH near 6 results in gypsum precipitation in addition to anhydrite. If the rate of calcium addition is too rapid, for example at 0.76 ml/min gypsum also forms.

Samples were run in accordance with the process of this invention in a controlled method with variations as specified in the table below. The standard procedure was:

50 ml of 1 N calcium chloride dihydrate was added at a constant rate to 50 ml of 1 N ammonium sulfate. Both solutions contained equal amounts of NaCl; the sulfate solution contained 5 parts/thousand of crystallization inhibitor, was maintained at 60° C. in a constant temperature bath, and was continually stirred during calcium solution addition. Alkalinity of the sulfate solution was adjusted with 2 M sodium hydroxide.

TABLE

| Additive | Concentration | Rate of Ca Addition | pH | Mineralogy |
|---|---|---|---|---|
| 1. Effect of pH | | | | |
| KXP-8 | 5 ppt | 0.076 ml/min | 4.0 | G + B + (A ?) |
| | 5 ppt | 0.076 ml/min | 5.4 | A + (G ?) |
| | 5 ppt | 0.076 ml/min | 8.2 | A + (G ?) |
| | 5 ppt | 0.076 ml/min | 11.5 | G |
| Belclene 200 | 5 ppt | 0.076 ml/min | 5.4 | G |
| | 5 ppt | 0.076 ml/min | 7.0 | A |
| | 5 ppt | 0.076 ml/min | 8.7 | A |
| 2. Effect of Rate of Ca Addition | | | | |
| KXP-8 | 5 ppt | 0.076 ml/min | 6.5 | A + (G ?) |
| | 5 ppt | 0.76 | 5.4 | G + A |
| Wayhib S | 5 ppt | 0.076 ml/min | 5.4 | A + (G) |
| | 5 ppt | 0.76 | 5.4 | G + A |
| Belclene 200 | 5 ppt | 0.076 ml/min | 8.7 | A |
| | 5 ppt | 0.76 | 8.7 | G + A |
| Belclene 500 | 5 ppt | 0.076 ml/min | 5.4 | A |
| | 5 ppt | 0.76 | 5.4 | G |
| 3. Effect of NaCl Concentration | | | | |
| KXP-8  0% NaCl | 5 ppt | 0.076 ml/min | 7.2 | G + (A) |
| 5% NaCl | 5 ppt | 0.076 ml/min | 6.5 | A (fine) + (G?) |
| 15% NaCl | 5 ppt | 0.076 ml/min | 7.4 | A (coarse) |

A - Anhydrite
B = Bassanite
G = Gypsum Most abundant mineral listed

The most abundant mineral, as shown by X-ray diffraction peak heights, is listed first. Parentheses means trace amounts. Parentheses with question mark means such small amount that XRD peak may actually be background noise in system.

What is claimed is:

1. A method of selectively forming anhydrite crystals to the predominant exclusion of formation of gypsum and bassanite, said method comprising:
   obtaining an aqueous solution of a calcium salt;
   obtaining an aqueous solution of a sulfate sale;
   adding to at least one of said aqueous solutions a small but effective amount of a selective crystallization inhibitor selected from the group of polymaleic acid, polyacrylic acid and organo-phosphate esters, which inhibit the formation of gypsum crystals, but does not interfere with formation of anhydrite; and
   slowly mixing said aqueous solutions at a temperature within the range of from about 60° C. to about 80° C. which will prevent the formation of bassanite while maintaining the pH above 3.5 but below 11.5.

2. The process of claim 1 wherein said selective crystallization inhibitor is polyacrylic acid, having a molecular weight within the range of from about 800 to about 1200.

3. The process of claim 1 wherein the ionic strength of said aqueous solutions is increased by addition of from 5% to 20% by weight of said solutions, of a water soluble inorganic salt, which is substantially inert with said solutions.

4. The process of claim 3 wherein said salt is sodium chloride.

5. The process of claim 1 wherein the added amount of selective crystallization inhibitor is from about 1 ppm to about 10,000 ppm.

6. The process of claim 5 wherein the added amount of said selective crystallization inhibitor is from about 500 ppm to 2,000 ppm.

7. The process of claim 1 wherein said process is conducted at a pH within the range of from about 4.5 to about 7.5.

8. The process of claim 7 wherein said process is conducted at a pH of from about 5 to about 6.

9. The process of claim 1 wherein said slow mixing is at a rate sufficiently slow to allow said selective crystallization inhibitor to contact the major portion of crystal nuclei, as they form.

10. The process of claim 9 wherein said slow mixing is at a rate of from about 0.01 ml/minute to about 0.2 ml/minute.

11. The process of claim 9 wherein said slow mixing is preferably at a rate of from about 0.05 ml/minute to about 0.15 ml/minute.

12. A method of selectively forming anhydrite crystals to the predominant exclusion of formation of gypsum and bassanite, said method comprising:

obtaining an aqueous solution of a calcium salt;

increasing the ionic strength of said aqueous solutions by addition of from 5% to 20% by weight of said solutions of a water soluble, inorganic salt which is substantially inert with said solutions;

adding to at least one of said aqueous solutions a small but effective amount of a selective crystallization inhibitor which inhibits the formation of gypsum and bassanite crystals but does not interfere with the formation of anhydrite, said inhibitor being selected from the group consisting of polymaleic acid, polyacrylic acid and organo-phosphate esters; and slowing mixing said aqueous solutions at a rate sufficiently slow to allow said selective crystallization inhibitor to contact the major portion of crystal nuclei as they form, said mixing being at a temperature within the range of about 60° C. to about 80° C. while maintaining the pH above 3.5 but below 11.5.

* * * * *